(12) United States Patent
Peck

(10) Patent No.: US 6,456,371 B1
(45) Date of Patent: Sep. 24, 2002

(54) ATTITUDE DETERMINATION WITH EARTH HORIZON-CROSSING INDICATORS AND RELATIVE-ATTITUDE PROPAGATION

(75) Inventor: Mason A. Peck, Torrance, CA (US)

(73) Assignee: The Boeing Company, Seattle, WA (US)

( * ) Notice: Subject to any disclaimer, the term of this patent is extended or adjusted under 35 U.S.C. 154(b) by 32 days.

(21) Appl. No.: 09/670,245

(22) Filed: Sep. 25, 2000

(51) Int. Cl.[7] .......................... G01B 11/26; B64G 1/36; G01C 9/00
(52) U.S. Cl. ............. 356/139.01; 244/171; 356/139.03; 702/153
(58) Field of Search ...................... 244/171; 356/139.01, 356/139.02, 139.03; 702/150–153

(56) References Cited

U.S. PATENT DOCUMENTS

| | | | |
|---|---|---|---|
| 3,576,999 A | * | 5/1971 | Blythe |
| 5,048,774 A | * | 9/1991 | Savoca .................... 244/171 |
| 5,572,316 A | * | 11/1996 | Zaffanella et al. ..... 356/139.01 |
| 6,026,337 A | * | 2/2000 | Krigbaum et al. ............ 701/13 |

* cited by examiner

Primary Examiner—Stephen C. Buczinski
(74) Attorney, Agent, or Firm—DiPinto & Shimokaji, P.C.

(57) ABSTRACT

A process for determining an attitude measurement of a spacecraft is provided. The process employs a Horizon-Crossing Indicator (HCI) sensor 108. The process uses three time tagged crossings of the earth circle 104 to provide sufficient HCI data to determine the earth center 106. Since these observations may be infrequent, the relative attitude of the spacecraft 100 changes for each observation time. Therefore, once the integrated angular rate data, and thus the attitude relative to some reference, for the first, second and third horizon crossings is obtained, the sensor bore-sight data for each of these observations is transformed back to a known reference time. In one example, the integrated angular rate data from the third and second horizon crossings is transformed back to first horizon crossing time T1. Then, existing techniques can be applied to compute the transformation from the axes of the satellite 100 at the reference time T1 to some other axes at that time, resulting in an attitude estimate for the satellite 100.

23 Claims, 5 Drawing Sheets

ATTITUDE DETERMINATION WITH EARTH HORIZON-CROSSING INDICATORS AND RELATIVE-ATTITUDE PROPAGATION

BACKGROUND OF THE INVENTION

1. Field of the Invention

The present invention generally relates to determining spacecraft attitude and, more particularly, to determining attitude using horizon-crossing indicators.

2. Description of the Related Art

In general, a spacecraft orbiting the earth randomly spins about a spin axis during its stay in the orbit. An attitude determination process can determine such spinning spacecraft's orientation relative to a coordinate system associated with the earth or another reference body such as the sun. Generally, the process is carried out using an onboard sensor, such as a Horizon-Crossing Indicator (HCI) mounted on the spacecraft.

Horizon-crossing indicators are light-detecting sensors which are configured to sense the edge, or the limb, of the earth, which appears as an illuminated disc. Each time the sensor detects the change from light to dark, or dark to light, it produces a signal that is used as an indication of horizon crossing for attitude control and guidance of the satellite. In a current design, as illustrated in FIG. 1, an HCI sensor 10 has a cone shaped field of view 12 that is often referred to as the bore-sight of the sensor. The bore-sight 12 is centered about the bore-sight axis 14 of the sensor, i.e., focal axis of the HCI sensor. As the spacecraft 16 constantly spins about a spin axis 18, this cone-shaped bore-sight 12 sweeps the space. When the bore-sight of the HCI sensor 10 scans from the space on to the illuminated disc 20 of the earth 22 or vice versa, it senses the change in the light intensity and produces a signal. In this respect, the signal may be produced as the bore-sight 12 crosses the earth horizons at a first position 24 or earth-in position and also as the bore-sight crosses the earth horizons at a second position 26 or earth-out position.

If the spacecraft spins in equilibrium, the HCI sensor 10 scans a linear path between the earth-in and earth-out positions 24 and 26, and forms a so-called chord 28 of the illuminated disc 20. The chord width between the earth in and earth out positions 24 and 26, together with the spin period of the spacecraft and the known size of the earth 22, indicate how far above or below the center of the earth the HCI sensor is scanning. This information allows computation of the angle between the spin axis and another axis from the spacecraft to the center of the earth. This measurement, together with an observation of the sun, can be used to determine the attitude of the satellite 16.

As mentioned above, in the current state of the art, spinning satellite attitude determination with horizon-crossing indicators requires constant (i.e. equilibrium) spin about a single axis from which earth-chord widths are calculated. With the current state of the art, however, it is not possible to make attitude-determination for an arbitrarily spinning spacecraft (one that is not in equilibrium). If the spacecraft spins arbitrarily, the HCI sensor scans a non-linear path resulting in a non-linear chord width that makes it difficult to determine how far the scanning action occurs from the center of the earth. This, in turn, results in ambiguities in determining the attitude of the subject spacecraft.

In light of the foregoing, a need therefore exists in the current spacecraft technology for a method that permits unambiguous determination of the attitude of a spacecraft.

SUMMARY OF THE INVENTION

The present invention provides a method for determining the attitude measurement of a spacecraft that spins arbitrarily while orbiting the earth. In particular, and regardless of spin-axis motion of the spacecraft, the present invention uses an integrated angular-rate data, e.g., data in the form of a propagated quaternion in conjunction with the horizon crossing indicator HCI data from at least three time-tagged horizon-crossing measurements that determine the earth center.

In one aspect of the present invention, a process for determining an attitude measurement of a spacecraft using a sensor which senses the illuminated circle of a celestial body, comprises the steps of generating a first signal indicative of a first horizon-crossing time; generating a second signal indicative of a second horizon-crossing time; generating a third signal indicative of a third horizon-crossing time; and determining the center of the celestial, from which an estimate of the spacecraft attitude with an additional measurement of a second celestial body can be made.

These and other features, aspects and advantages of the present invention, will become better understood with reference to the following drawings, description and claims.

DESCRIPTION OF THE PREFERRED EMBODIMENT

Figure 1:
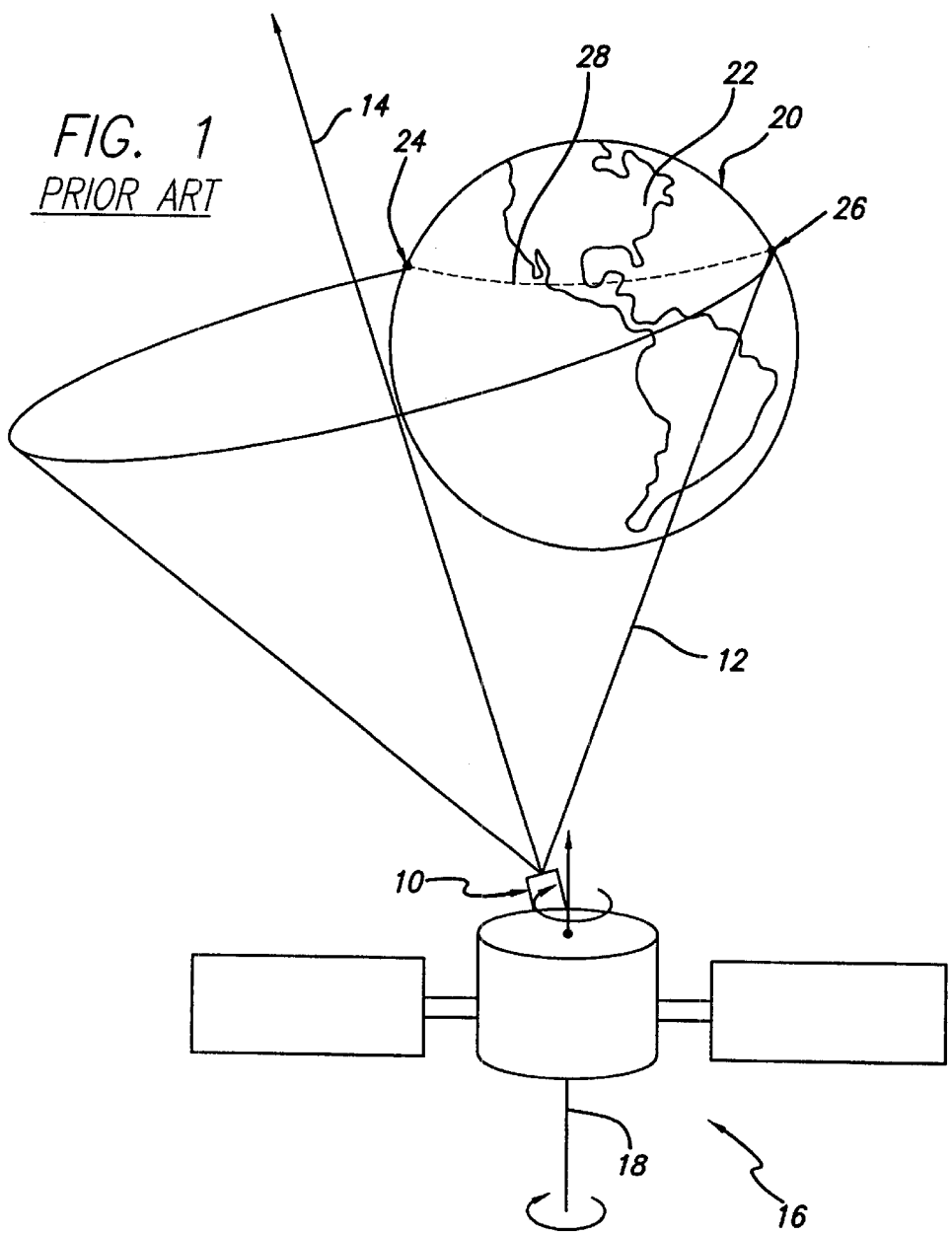
FIG. 1 is a schematic illustration of a satellite having a prior art HCI sensor.

As will be described below, the present invention provides a method for determining the attitude of a spacecraft, such as a satellite, that spins arbitrarily while orbiting the earth or another reference body such as the sun. Although the present invention is exemplified using the earth, it is within the scope of the present invention that the present invention can be used with any celestial body such as the moon, Mars or other planets and stars. In particular, and regardless of spin-axis motion of the spacecraft, the present invention uses integrated angular-rate data, e.g. data in the form of a propagated quaternion, in conjunction with the horizon crossing indicator (HCI) data from at least three time-tagged horizon-crossing measurements that determine the earth center. In the context of this invention, horizon crossing can be defined as the detection of the illuminated circle or the limb of the earth by the HCI. For example, such data may be obtained from a spacecraft having very low nutation damping and large nutation angles, or when a spacecraft undergoes long-duration slewing maneuvers. The integrated angular-rate data provides a measurement of the change in spacecraft attitude from one measurement to the next. In the case of quaternion propagation, the propagated quaternion (an array of four values denoted by q that describe the change in coordinates from one time, $t_i$, to the next, $t_j$) is $$\dot{q} = \begin{Bmatrix} \dot{\varepsilon} \\ \dot{\eta} \end{Bmatrix} = \begin{Bmatrix} \frac{1}{2}(\varepsilon^x + \eta I)\omega \\ \frac{1}{2}\varepsilon^T \omega \end{Bmatrix} \text{ where } q = \begin{Bmatrix} \varepsilon \\ \eta \end{Bmatrix} = \begin{Bmatrix} a_1 \sin\frac{\zeta}{2} \\ a_2 \sin\frac{\zeta}{2} \\ a_3 \sin\frac{\zeta}{2} \\ \cos\frac{\zeta}{2} \end{Bmatrix} = \int_{ti}^{tj} \dot{q} dt.$$

In this expression $a_i$, (i=1 to 3) are the components of the axis of rotation from one coordinate system to the other and $\zeta$ is the angle of rotation about that axis. $\omega$ represents the angular velocity of one coordinate system (or rigid body) relative to another. The quaternion allows one to compute a direction-cosine matrix Q from $$Q = (q_4^2 - q^T q) \cdot 1 + 2qq - 2q_4 q^x$$

where the superscript 'x' represents a 3×3 matrix equivalent of the vector cross product. Both q and Q contain information about how the attitude at the later time $t_j$ is related to the attitude at the earlier time $t_i$, that is, the relative attitude change since time $t_i$.

With the present invention, this data can be subsequently used to estimate the attitude of the spacecraft, which is not possible with the prior art techniques. In the prior art, an attitude determination with horizon-crossing indicators (HCIs) requires an equilibrium-spin about a single axis, from which earth-chord widths are calculated. In fact, such prior art techniques have limited applicability because they are viable only for a spacecraft undergoing equilibrium spin conditions.

In accordance with the principles of this invention, three geometrically separate HCI observations or three time tagged crossings of the earth's horizon provide sufficient HCI data to determine the earth center. Since these observations may be infrequent, and not simultaneous, the relative attitude of the spacecraft or the subject body changes from one measurement time to another measurement time. Therefore, in the present invention, once the integrated angular-rate data from at least three time tagged horizon-crossings is obtained, the data from these observations is transformed back to a known reference time such as either when the earth's horizon was observed first time or when the sun was observed. The sun or another celestial body can also be used for determining the attitude measurement of the spacecraft with an additional measurement of the sun and another celestial body. Then, existing techniques can be applied to compute the transformation from spacecraft axes at the reference time to some other axes at that time, resulting in an attitude estimate for an arbitrarily spinning system. The location of the sensor's bore-sight is assumed to be known with accuracy sufficient for the given implementation. Any number (three or greater) horizon measurements can be used to provide a least-squares attitude estimate in the case of noisy measurements via a Kalman filter, a pseudoinverse, or a recursive or batch least-squares process, to list a few examples. A recursive least-squares implementation is described in detail below.

Figure 2:
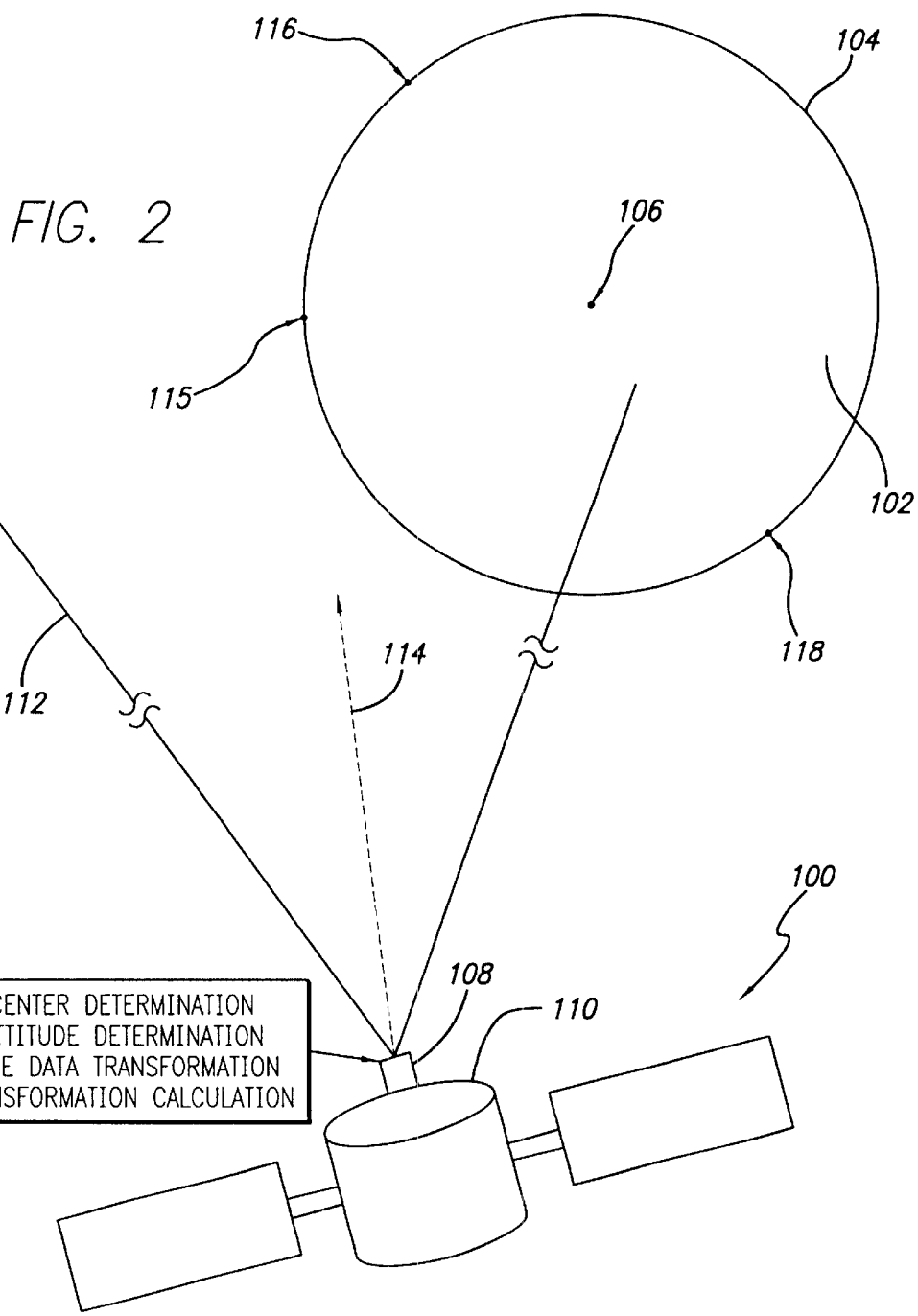
FIG. 2 is a schematic illustration of a satellite orbiting earth wherein the satellite utilizes an onboard HCI sensor to detect the illuminated circle of the earth in accordance with the present invention.

Reference will now be made to the drawings wherein like numerals refer to like parts throughout. FIG. 2 illustrates a spacecraft 100 such as a satellite orbiting the earth 102. As it appears to a satellite-fixed observer from the relative position of the satellite 100, the earth 102 has an illuminated circle 104 or earth circle with a center 106 and a radius φ (phi). The center 106 will be referred to as the "earth center" hereinafter. It is understood that the magnitude of φ depends on the instantaneous altitude of the satellite 100 above the earth 102. The satellite 100 may have at least one sensor, preferably a light detecting sensor 108. In the preferred embodiment the light detecting sensor 108 is a Horizon-Crossing Indicator (HCI) mounted on a body 110 of the satellite 100. The HCI 108 may have a cone shaped bore-sight 112 centered about a bore axis 114. However, it is also within the scope of the present invention that the light detecting sensor 108 can alternatively be replaced with any kind of sensor detecting various radiation types that indicate a crossing of the edge of a spherical celestial body.

As previously mentioned, the method of the present invention may use three separate HCI observations to determine the earth center 106 from the satellite 100. During the observations, the satellite 100 may undergo non-equilibrium, large angle motions regardless of its spin axis. Referring back to FIG. 2, accordingly, at a first horizon-crossing time T1, the bore-sight 112 of the HCI 108 may cross or detect the earth circle 104 at a first location 115 and the HCI generates a first signal indicating the first horizon-crossing time T1. As the satellite 100 continues its arbitrary movement, and at a second horizon-crossing time T2, the HCI bore-sight 112 may detect the earth circle 104 at a second location 116 and the HCI generates a second signal indicating the second horizon-crossing time T2. Subsequently, at a third horizon-crossing time T3, the HCI bore-sight 108 may detect the earth circle 104 at a third location 118 and the HCI generates a third signal indicating the third horizon-crossing time T3.

Figure 3A:
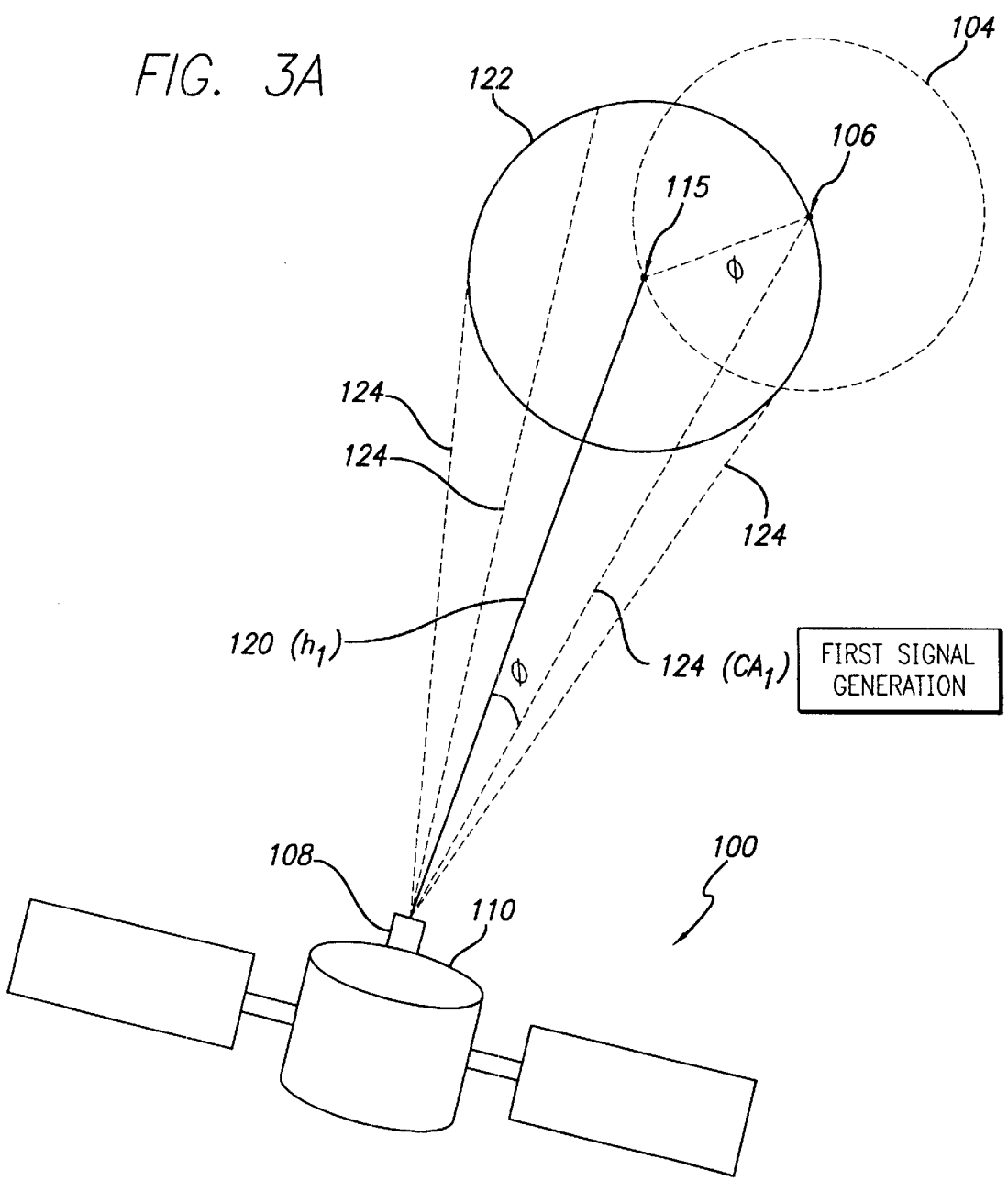
FIG. 3A is a schematic illustration of a first horizon-crossing step of the present invention.
Figure 3B:
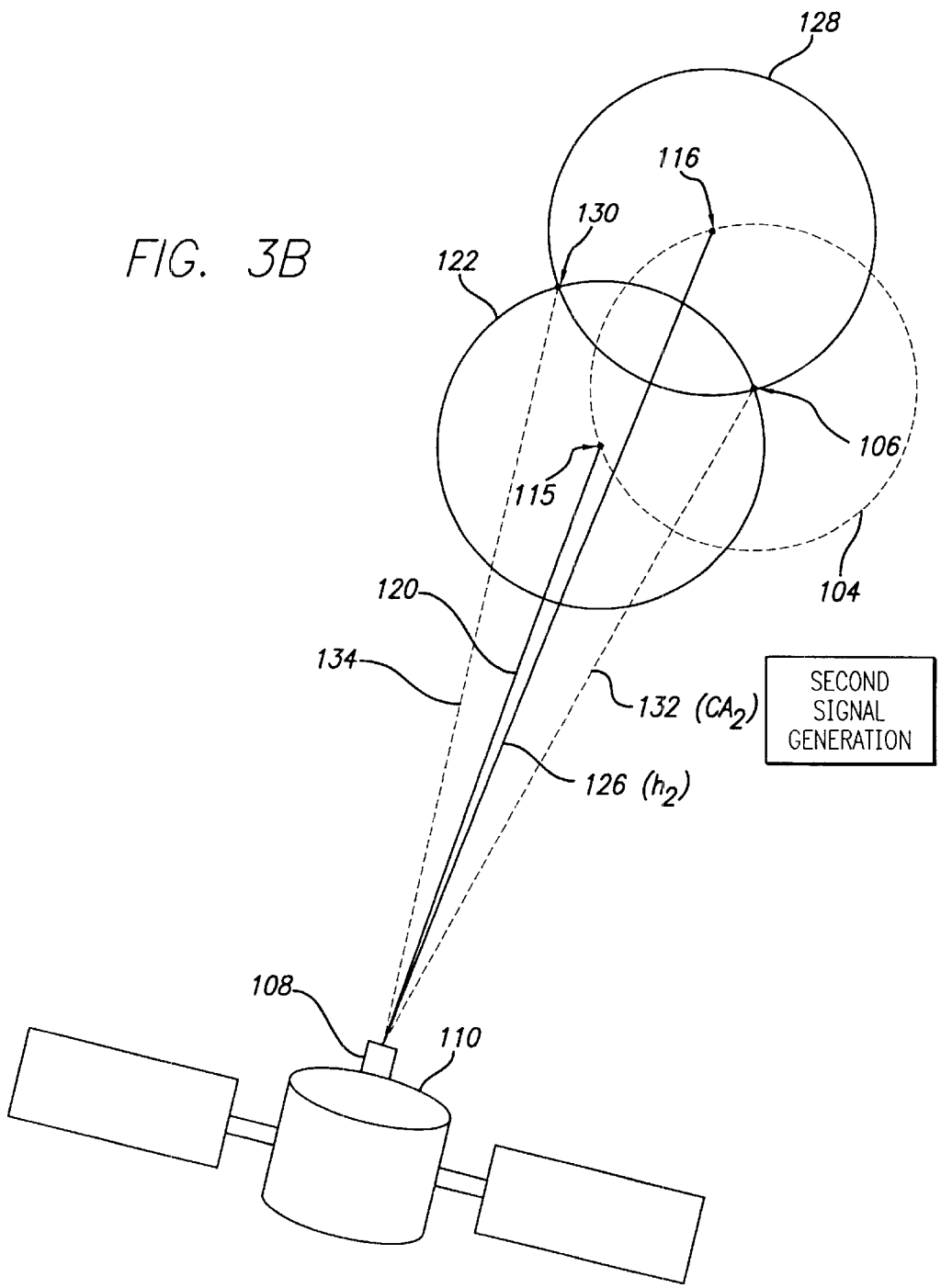
FIG. 3B is a schematic illustration of a second horizon-crossing step of the present invention.

In the following section, the inventive method will be described with FIGS. 3A to 3C. However, although FIGS. 3A–3B show the earth center 106, this is only for clarification purposes and to better illustrate how the inventive method works in determining the earth center 106. In fact, the earth center 106 is determined at the third horizon-crossing that is illustrated in FIG. 3C.

FIG. 3A illustrates the first horizon-crossing at a first attitude of the randomly spinning satellite. At the first horizon-crossing time T1, if it is assumed that a first bore-sight axis 120 is tangent to the earth circle 104 at the first location 115, the first bore-sight axis 120 is φ distance (radius of the earth circle 104) away from the center 106 of the earth circle 104. In other words, the earth center 106 (which is being sought) is on a first observation circle 122 of radius φ, formed about the first axis 120 at the first location 115. Then, at the first horizon-crossing time T1, the angle between the bore-sight axis and a first center axis 124 equals φ. The first center axis $CA_1$ 124 is assumed to be directed from the HCI sensor 108 to the earth center 106 which is somewhere on the first observation circle 122 at the first horizon crossing time T1. Accordingly, the first center axis 124 crosses the earth center 106 at the first crossing time T1.

As illustrated in FIG. 3B, after the first horizon-crossing, the spinning satellite moves into a second relative attitude. At the second horizon-crossing time T2, a second bore-sight axis 126 may be tangent to the earth circle 104 at the second location 116. The second bore-sight axis 126 is φ distance away from the center 106 of the earth circle 104. In the case of a spacecraft with a single HCI, the bore-sight is simply the same one but rotated by the relative attitude change (described in q and Q). As shown in FIG. 3B, if a second observation circle 128, having a radius φ, is formed about the second bore-sight axis 126 at the location 116, the second circle overlaps with the first observation circle 122 and intersects it at two distinct intersection points. Since both of the circles 122 and 128 have their centers 114 and 116 on the earth circle 104 and both have the radius φ, one of the intersection points must be the earth center 106. The other intersection point will be denoted with reference numeral 130. As it is seen, at the second horizon-crossing, the problem of determining the earth center is simplified down to two intersection points. At this point, it is understood that, the earth center 106 is crossed by a second center axis CA$_2$ 132 which extends between the HCI sensor 108 and the earth center 106. However, there exists another center axis 134 that crosses the second intersection 130 and extends between the HCI sensor 108 and the second intersection 130. Therefore, from an observer's point of view, there still exists an ambiguity as to which one of two intersections 130 and 106 can be the earth center. Thus, the earth center 106 cannot be determined before the third horizon-crossing measurement. It is understood that the relative coordinates of the second center axis CA$_2$ 132 would be different from the relative coordinates of the first center axis CA$_1$ 124 in FIG. 3A. As previously mentioned, although in FIGS. 3A and 3B the location of the earth center and corresponding first and second center axes 124 and 132 are illustrated, this is for clarification purposes.

Figure 3C:
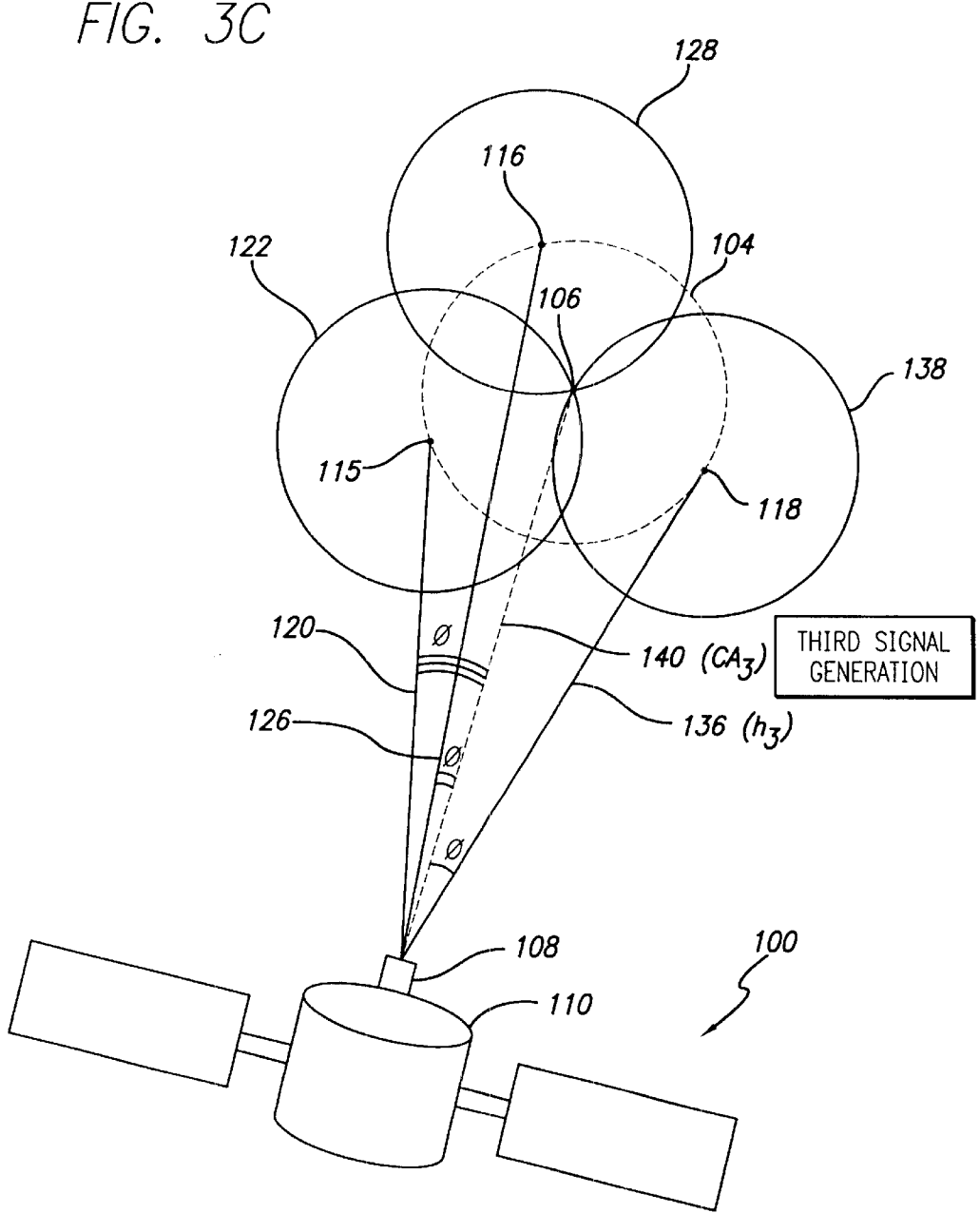
FIG. 3C is a schematic illustration of a third horizon-crossing step of the present invention.

As shown in FIG. 3C, after the second crossing, the spinning satellite moves into a third attitude. At the third horizon-crossing time T3, a third bore-sight axis 136 becomes tangent to the earth circle 104 at the third location 118. The third bore-sight axis 136 is φ distance away from the center 106 of the earth circle 104. Similar to the second horizon-crossing, a second observation circle 138 with radius φ is formed about the third bore-sight axis 136 at the location 118. Since the observation circles 122, 128 and 138 have their centers on the earth circle 104, they intersect one another at the earth center 106, thereby revealing the earth center 106. Accordingly, a third center axis CA$_3$ 140 extends between the HCI 108 and the earth center 106 thereby crossing the earth center 106. In this respect, the third center axis CA$_3$ 140 is at an angle φ away from the first, second and third bore-sight axes 120, 126 and 136. It is understood that the relative coordinates of the third center axis CA$_3$ 140 would be different from the relative coordinates of the second center axis CA$_2$ 132 and the first center axis CA$_1$ 124 in FIGS. 3A and 3B.

In this embodiment, three time tagged crossings of the earth's horizon, i.e., the first, second and third observations, provide sufficient HCI data to determine the earth center 106. Since these observations may be infrequent, the relative attitude of the spacecraft or the subject body (and thus the attitude of the bore-sight) changes for each observation time, i.e., T1, T2 and T3. Therefore, in the present invention, once the integrated angular rate data for the first, second and third horizon crossings is obtained, the bore-sight location for each of these observations is transformed back to a known reference time such as either when the earth's horizon was first observed or when the sun was first observed. In one example, the bore-sight location from the third and second horizon crossings is transformed back to first horizon crossing time T1. Then, existing techniques can be applied to compute the transformation from the axes of the satellite 100 at the reference time T1 to some other axes at that time, resulting in an attitude estimate for the satellite 100.

The inventive method widely employs mathematical manipulation of vector calculations to locate the earth center 106 based on at least three tagged horizon-crossings. For example, the first axis 120, in FIG. 3A, is represented by a first bore-sight vector h$_1$ that lies in the first bore-sight axis 120. The vector components of h$_1$ are known in the spinning spacecraft body 110 that will be referred to as spacecraft frame B. A first center vector c$_1$ may lie in the first center axis CA$_1$ 124 which is directed from the HCI sensor 108 to the center 106 of the earth which will be referred to as inertial frame N, such as the Earth-Centered Inertial (ECI) frame. The relationship between the vectors h$_1$ and c$_1$ can be expressed by a dot product of them, which is show in Equation (1) as:

$$h_1 c_1 = \cos(\phi) \quad (1)$$

Referring to FIG. 3A, with only one horizon-crossing observation, the body frame B fixed vector components of the vector c$_1$ can be anywhere on the first observation circle 122 of radius φ centered at h$_1$. Referring to FIG. 3B, accordingly, a second bore-sight vector h$_2$ of the frame B lies in the second bore-sight axis 126. The vector components of h$_2$ are also known in the spinning spacecraft frame B. A second center vector c$_2$ may originate from the satellite body frame B toward the center 106 of the earth frame N. The vector c$_2$ lies in the second center axis CA$_2$ 132. It is understood that the components of the vector c$_2$ are different from the components of the vector c$_1$. Referring to FIG. 3C, a third bore-sight vector h$_3$ of the frame B lies in the third bore-sight axis 136. The vector components of h$_3$ are known in the spinning spacecraft frame B. A third center vector c$_3$ may originate from the satellite frame B toward the center 106 of the earth frame N. The vector C$_3$ lies in the third center axis CA$_3$ 140 crossing the earth center 106. The vector C$_3$ is at an angle φ away from the first, second and third bore-sight vectors h$_1$ and h$_2$, and h$_3$. The components of the vector C$_3$ would be different from the components of the vectors c$_1$ and c$_2$.

In light of the aforementioned method, a nutating spacecraft with only one HCI bore-sight can use this single source of measurements to compile sufficient information to determine the earth's center. If a vector b is fixed in B reference frame (satellite) and an arbitrary vector n is fixed in N reference frame (the earth), these vectors may be related through a transformation matrix Q, as shown in Equation (2), such that $$Qb = n. \quad (2)$$

Since the B frame's orientation relative to N frame changes with the motion of the spacecraft, the $i^{th}$ measurement of the vector b (b$_i$) must be related to the vector n with a transformation that accounts for this motion. This is expressed in Equation (3):

$$Q_i b_i = n. \quad (3)$$

If it is assumed that vector n is constant, the $i^{th}$ measurement can be related to the $j^{th}$ measurement as shown in Equations (4) or (5):

$$Q_i b_i = Q_j b_j \quad (4)$$

$$b_i = Q_i^T Q_j b_j. \quad (5)$$

To determine an arbitrary center vector c (e.g., c$_1$, c$_2$ or c$_3$) in the frame B (a matrix of the components of the center vector c in the satellite frame B), three observations taken in different attitudes can be assembled but referenced to a single (perhaps arbitrary) attitude represented by the transformation matrix Q$_1$. These three observations taken in the first, second and third attitudes are shown in FIGS. 3A–3C. Then, if the relationship of Q$_1$ to some other attitude, in which the center vector c would like to be known, the desired attitude is merely transformed as in Equation (5).

The center vector c changes as the spacecraft's attitude changes, although φ remains constant at a certain altitude. The coordinates of the bore-sight vector h do not vary in B because it is fixed in B; however, it does vary in N. Therefore, the center vector c must be determined from h and $c_i$ (e.g., $c_1$, $c_2$ and $C_3$) and account for the motion of h in N. It should be noted that $Q_i^T Q_j$ is available as the propagated attitude from quaternion integration or other means, as described above.

The inventive method will be exemplified using the above given three observations, and the solution will be later extended to a least-squares fit to many measurements. For the second observation shown in FIG. 3B, the coordinates of the second center vector $c_2$ in B can be expressed in Equation (6) as:

$$c_2 = Q_2^T Q_1 c_1 \tag{6}$$

and for the third observation shown in FIG. 3C, the coordinates of the third center vector $c_3$ in B can be expressed in Equation (7) as:

$$c_3 = Q_3^T Q_1 c_1. \tag{7}$$

Also, if Equation (1) is expressed in matrix form as in Equation (8)

$$h^T c_i = \cos(\phi) \tag{8}$$

Substitution leads to following Equations (9), (10) and (11)

$$h^T c_1 = \cos(\phi) \tag{9}$$

$$h^T Q_2^T Q_1 c_1 = \cos(\phi) \tag{10}$$

$$h^T Q_3^T Q_1 c_1 = \cos(\phi) \tag{11}$$

which can be expressed in Equation (12) as $$\begin{bmatrix} h^T \\ h^T Q_2^T Q_1 \\ h^T Q_3^T Q_1 \end{bmatrix} c_1 = \begin{bmatrix} 1 \\ 1 \\ 1 \end{bmatrix} \cos(\phi) \tag{12}$$

This system of equations is linear in $c_1$, and if the observations (the rows of the matrix on the left) are linearly independent, the solution can be given with Equation 13, which is:

$$c_1 = \begin{bmatrix} h^T \\ h^T Q_2^T Q_1 \\ h^T Q_3^T Q_1 \end{bmatrix}^{-1} \begin{bmatrix} 1 \\ 1 \\ 1 \end{bmatrix} \cos(\phi) \tag{13}$$

In the case of many measurements, the solution can be found from a pseudoinverse, which is given in Equation (14):

$$c_1 = \begin{bmatrix} h^T \\ h^T Q_2^T Q_1 \\ \vdots \\ h^T Q_n^T Q_1 \end{bmatrix}^+ \begin{bmatrix} \cos(\phi_1) \\ \cos(\phi_2) \\ \vdots \\ \cos(\phi_n) \end{bmatrix} \tag{14}$$

It should be noted that in Equation (14), the time-varying satellite altitude is accommodated as φ(t) because the spacecraft-to-earth center vector c changes in ECI throughout the orbit. For this reason, a recursive least-squares solution with a forgetting factor is also usable. In such a solution, the earth's center would still be referenced to the $Q_1$ attitude, for example the first attitude or another reference attitude. If the forgetting factor is small enough, the center vector c will represent approximately the current earth center in the reference attitude $Q_1$. If the measurement matrices $A_n$ and $B_n$ from equation (13) are defined as expressed in Equation (15):

$$A_n c_1 = B_n \tag{15}$$

Then, by using A(k) and B(k) (the $k^{th}$ rows of $A_n$ and $B_n$) with a forgetting factor $0 < \lambda \leq 1$ the Equations (16), (17) and (18) can be obtained, $$K(k) = P(k-1)A^T(k)[\lambda 1 + A(k)P(k-1)A^T(k)]^{-1} \tag{16}$$

$$P(k) = \lambda^{-1}[1 - K(k)A(k)]P(k-1) \tag{17}$$

$$c_1(k) = c_1(k-1) + K(k)[B(k) - A(k)c_1(k-1)] \tag{18}$$

where $c_1(k)$ is the $k^{th}$ iteration of the solution. The problem is 'regularized' by initializing Equation (19), $$P(0) = \epsilon^{-2} \tag{19}$$

where ε is a small positive number (~$1.0 \times 10^{-4}$ to $1.0 \times 10^{-16}$, depending upon the application). Setting λ=1 allows the recursive formulation to use all the measurements with equal weighting.

With the center vector c that is identified for a single reference attitude $Q_1$, we can proceed to the determination of the reference attitude in ECI using sun observations (also referenced to that attitude) via Davenport's q method, QUEST, FOAM, or many other optimal attitude-determination methods for non-spinning satellites. Two observations (the center vector c and the sun) and simultaneous knowledge of these vectors in ECI are sufficient for these methods to determine attitude, but multiple vector observations are typically used.

It should be understood, of course, that the foregoing relates to preferred embodiments of the invention and that modifications may be made without departing from the spirit and scope of the invention as set forth in the following claims.

I claim:

1. A process for determining an attitude measurement of a spacecraft using a sensor which senses an illuminated circle of a celestial body and an initial reference attitude of a reference celestial body, comprising the steps of:
   generating a first signal indicative of a first horizon-crossing time;
   generating a second signal indicative of a second horizon-crossing time;
   generating a third signal indicative of a third horizon-crossing time;
   determining a center of the illuminated circle of the celestial body using the first, second and third signals; and
   determining an attitude measurement of the spacecraft from the center of the illuminated circle and the initial reference attitude.

2. The process of claim 1, wherein at the first horizon-crossing time the spacecraft is in a first attitude.

3. The process of claim 2, further comprising detecting the illuminated circle prior to generating the first signal.

4. The process of claim 3, wherein the illuminated circle is detected when a bore-sight of the sensor passes over a first location on the illuminated circle.

5. The process of claim 4, further comprising forming a first observation circle about a bore-sight axis of the sensor, wherein the first location is the center of the first observation circle.

6. The process of claim 5, wherein the center of the illuminated circle is located on the first observation circle.

7. The process of claim 6, wherein at the second horizon-crossing time the spacecraft is in a second attitude.

8. The process of claim 7, further comprising detecting the illuminated circle prior to generating the second signal.

9. The process of claim 8, wherein the illuminated circle is detected when the bore-sight of the sensor passes over a second location on the illuminated circle.

10. The process of claim 9, further comprising forming a second observation circle about the bore-sight axis of the sensor, wherein the second location is the center of the second observation circle.

11. The process of claim 10, wherein the first and second circles intersect each other at two intersection points.

12. The process of claim 11, wherein the center of the illuminated circle is at one of the intersection points.

13. The process of claim 12, wherein at the third horizon-crossing time the spacecraft is in a third attitude.

14. The process of claim 13, further comprising detecting the illuminated circle prior to generating the third signal.

15. The process of claim 14, wherein the illuminated circle is detected when the bore-sight of the sensor passes over a third location on the illuminated circle.

16. The process of claim 15, further comprising forming a third observation circle about the bore-sight axis of the sensor, wherein the third location is the center of the third observation circle.

17. The process of claim 16, wherein the center of the illuminated circle of the celestial body is located at an intersection point where the first, second and third observation circles intersect each other.

18. The process of claim 17, wherein the step of determining the attitude measurement of the spacecraft comprises determining angular rate data for the first, second and third horizon-crossings.

19. The process of claim 18, further comprising transforming the angular rate data from the second and the third crossings to the first horizon-crossing time.

20. The process of claim 19, further comprising calculating a transformation from axes of the spacecraft at the first horizon-crossing time to other axes at the first horizon crossing time.

21. The process of claim 1, wherein the celestial body and the reference celestial body are the earth.

22. The process of claim 1, wherein the reference celestial body is the sun.

23. A process for determining an attitude measurement of a spacecraft having an unmeasured spin-axis motion and using a sensor which senses an illuminated circle of a celestial body and an initial reference attitude of a reference celestial body, comprising the steps of:

generating a first signal indicative of a first horizon-crossing time;

generating a second signal indicative of a second horizon-crossing time;

generating a third signal indicative of a third horizon-crossing time;

determining a center of the illuminated circle of the celestial body using the first, second and third signals; and determining an attitude measurement of the spacecraft from the center of the illuminated circle and the initial reference attitude.

* * * * *